No. 895,503. PATENTED AUG. 11, 1908.
M. B. SCHENCK.
CASTER.
APPLICATION FILED NOV. 4, 1907.
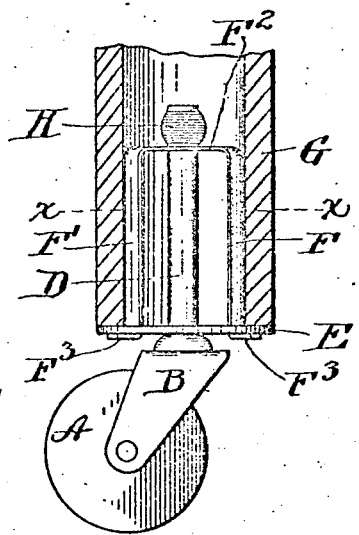
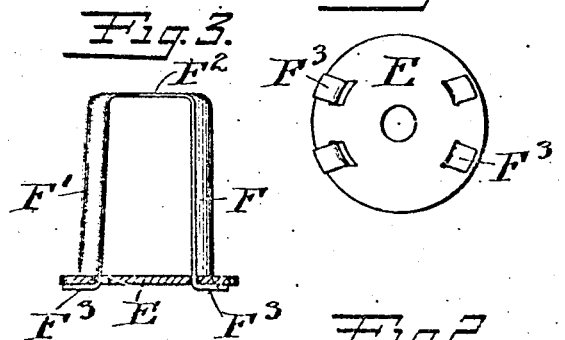
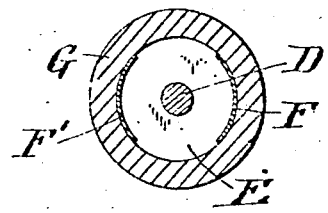
Witnesses: Inventor
M. B. Schenck
By his Attorneys

UNITED STATES PATENT OFFICE.

MARTIN B. SCHENCK, OF MERIDEN, CONNECTICUT.

CASTER.

No. 895,503.    Specification of Letters Patent.    Patented Aug. 11, 1908.

Application filed November 4, 1907. Serial No. 400,453.

*To all whom it may concern:*

Be it known that I, MARTIN B. SCHENCK, a citizen of the United States, residing at Meriden, county of New Haven, State of Connecticut, have invented certain new and useful Improvements in Casters, of which the following is a full, clear, and exact description.

My invention relates to certain new and useful improvements in casters, in which the parts are made of metal and so constructed as to permit the caster wheel to rotate on its own axis, at the same time rotate in the supporting frame or socket.

The object of the invention is to produce a simple, inexpensive and effective device which, because of its construction, is very strong and will effectively support the caster proper in the correct position relatively to the furniture leg.

In the drawings: Figure 1 is a section of the lower end of a furniture leg with my improved caster in place, the caster and socket being shown in side elevation. Fig. 2 is a cross section on the line X—X of Fig. 1, looking down. Fig. 3 is a side elevation of the caster socket removed, with the caster detached therefrom. Fig. 4 is a view of the same part taken from a position at right angles to that of Fig. 3. Fig. 5 is a lower plan view.

A is the caster wheel. B is a bracket of the usual form pivotally supporting said wheel.

D is a pintle or spindle projecting up from bracket B. The socket is preferably formed of two separate pieces, one of which I will term a washer, the other a frame. These parts may, of course, be integrally united, or formed of one piece, as desired.

E is the washer, the same surrounding the pintle D.

The frame of the socket is preferably formed of a strip of metal shaped by suitable dies or punches so as to double the material to form two sides F F' connected at their upper ends as at F². The sides F F' are semi-circular or curved so as to present a broad convex bearing surface corresponding to the bore in the furniture leg into which the socket is to be pushed.

G represents the lower end of a furniture leg, the lower extremity being arranged to rest upon the edge of the washer E. The upper end of the caster pintle D may be swaged down, as at H, to prevent the same from falling out.

Although the side members F F' of the socket may be connected to the washer E in any desired way, one convenient method of securing said parts together comprises tangs F³ at the lower ends of the side members which pass through suitable openings in the washer E and are then turned or offset, as shown, to prevent the separation of the parts. As shown in Fig. 5, the passages for one set of these tangs F³ may be of such width as to permit one side F' to yield slightly so as to permit the frame to be compressed to that degree necessary to permit it to enter the opening in the leg G.

In operation it is merely necessary to push the socket in the opening in the lower end of the leg, and the outward spring action of one or both of the side sections F F' will be sufficient to hold the socket and caster in place.

The socket may be made of any desired size, by which I mean the diameter of the frame may be varied at will to permit it to be fitted to furniture legs having different sized bores. By making the side sections of the frame convex a broad surface engagement is effected between the external walls thereof, and the internal wall of the leg G, thereby affording sufficient friction to prevent the accidental dropping out of the socket, and also affording a very superior support for the caster when in operation, since by securing a broad surface bearing, the strain of the caster is distributed uniformly around the pintle D to the leg irrespective of the position of the caster wheel proper.

While in the drawings I have shown the side sections of the frame as comparatively narrow, obviously they might be extended to a still greater degree, in fact to such an extent as to practically close in or hide the body of the pintle D, and this may be done without departing from the spirit and scope of my invention. For an effective support, however, it is not necessary to make the side sections of such width as to form an inclosing tube or cylinder.

What I claim is,

1. A caster, comprising a wheel, bracket and pintle, and a socket comprising a washer-like base and a frame having two side pieces projecting upwardly therefrom and united at the top, said side pieces being curved transversely to form a broad convex bearing surface for engagement with the inner wall of a furniture leg, the lower ends of said frame passing through said washer and being offset below the same.

2. A caster, comprising a wheel, bracket and pintle, and a socket comprising a washer-like base and a frame having two side pieces projecting upwardly therefrom and united at the top, said side pieces being curved transversely to form a broad convex bearing surface for engagement with the inner wall of a furniture leg, and means to prevent said pintle from becoming accidentally detached therefrom, the lower ends of said frame passing through said washer and being offset below the same.

3. In a furniture caster, a wheel, bracket and pintle, a socket therefor comprising a washer through which said pintle passes, and semi-circular side members having broad convex bearing surfaces for engagement with the inner wall of the furniture leg, the edges of said semi-circular side members being spaced apart, a connection for the upper end of said side members, said connection having a perforation through which said pintle passes, the ends of said side members being connected with said washer by extensions passing through said washer and offset below the same, one of said connections being yielding.

4. In a furniture caster, a wheel, bracket and pintle, a socket therefor comprising a washer through which said pintle passes, and semi-circular side members having broad convex bearing surfaces for engagement with the inner wall of the furniture leg, the edges of said semi-circular side members being spaced apart, a connection for the upper end of said side members, said connection having a perforation through which said pintle passes, one of said side members being yieldingly connected with said washer, the other side member being rigidly connected to said washer said connections including projections on said side members passing through said washer.

5. In a furniture caster, a wheel, bracket and pintle, a socket therefor comprising a washer through which said pintle passes, and semi-circular side members having broad convex bearing surfaces for engagement with the inner wall of the furniture leg, the edges of said semi-circular side members being spaced apart, a connection for the upper end of said side members, said connection having a perforation through which said pintle passes, one of said side members being yieldingly connected with said washer, the other side member being rigidly connected to said washer, the upper extremity of the pintle extending above the upper connection for the side members and having a shoulder thereon to prevent disengagement of the caster from the socket the lower ends of the side members passing through said washer and being offset to prevent separation.

MARTIN B. SCHENCK.

Witnesses:
 WILLIAM C. DREW,
 MAURICE C. LANGE.